(12) United States Patent
Kastalsky

(10) Patent No.: US 8,795,772 B2
(45) Date of Patent: Aug. 5, 2014

(54) METHOD OF FORMING NANO-PADS OF CATALYTIC METAL FOR GROWTH OF SINGLE WALLED CARBON NANOTUBES

(75) Inventor: Alexander Kastalsky, Wayside, NJ (US)

(73) Assignee: Nano-Electronic And Photonic Devices And Circuits, LLC, Bridgeport, PA (US)

( * ) Notice: Subject to any disclaimer, the term of this patent is extended or adjusted under 35 U.S.C. 154(b) by 56 days.

(21) Appl. No.: 13/401,220

(22) Filed: Feb. 21, 2012

(65) Prior Publication Data

US 2013/0217565 A1 Aug. 22, 2013
US 2014/0155253 A9 Jun. 5, 2014

Related U.S. Application Data

(63) Continuation-in-part of application No. 12/986,429, filed on Jan. 7, 2011, now Pat. No. 8,492,249, which is a continuation-in-part of application No. 12/011,044, filed on Jan. 24, 2008, now Pat. No. 8,440,994.

(51) Int. Cl.
*C23C 16/00* (2006.01)
*B05D 5/00* (2006.01)
*B05D 1/32* (2006.01)

(52) U.S. Cl.
USPC .............. 427/250; 427/248.1; 427/249.1; 427/256; 427/282

(58) Field of Classification Search
USPC .............. 427/256, 282, 249.1, 248.1, 250
See application file for complete search history.

(56) References Cited

U.S. PATENT DOCUMENTS

| | | | |
|---|---|---|---|
| 5,872,422 A * | 2/1999 | Xu et al. | 313/311 |
| 2004/0191158 A1* | 9/2004 | Liu et al. | 423/447.3 |
| 2010/0193350 A1* | 8/2010 | Liu et al. | 204/192.15 |
| 2010/0255674 A1* | 10/2010 | Byun et al. | 438/626 |

* cited by examiner

*Primary Examiner* — Kelly M Gambetta
(74) *Attorney, Agent, or Firm* — Baker & Hostetler LLP

(57) ABSTRACT

Two methods of producing nano-pads of catalytic metal for growth of single walled carbon nanotubes (SWCNT) are disclosed. Both methods utilize a shadow mask technique, wherein the nano-pads are deposited from the catalytic metal source positioned under the angle toward the vertical walls of the opening, so that these walls serve as a shadow mask.

In the first case, the vertical walls of the photo-resist around the opening are used as a shadow mask, while in the second case the opening is made in a thin layer of the dielectric layer serving as a shadow mask. Both methods produce the nano-pad areas sufficiently small for the growth of the SWCNT from the catalytic metal balls created after high temperature melting of the nano-pads.

8 Claims, 4 Drawing Sheets

METHOD OF FORMING NANO-PADS OF CATALYTIC METAL FOR GROWTH OF SINGLE WALLED CARBON NANOTUBES

This application is a continuation-in-part from the U.S. patent application Ser. No. 12/986,429, filed Jan. 7, 2011, which itself is a continuation-in-part from U.S. patent application Ser. No. 12/011,044, filed Jan. 24, 2008, the disclosures of which are incorporated herein by reference in their entireties.

FIELD OF THE INVENTION

The invention relates to a method of producing ultra-small pads of catalytic material for the growth of single walled semiconductor-type carbon nanotubes.

BACKGROUND OF THE INVENTION

The Carbon Nanotubes (CNT) are viewed to be a new key element for future electronics and photonics. In the CNT, such unique properties as quantization of the electron spectrum, ballistic electron propagation along the tube, current densities as high as $10^9$ A/cm$^2$, existence of the semiconductor phase, possibilities for n- and p-doping with a high carrier mobilities, as well as excellent thermal conductance, make the nanotubes a great candidate for future novel high-speed, high efficiency electronic and photonic devices.

It is extremely important that all these outstanding properties are related to the semiconductor single walled carbon nanotubes (SWCNT), which are expected to be the building blocks for multiple semiconductor devices and circuits, with the properties far superior than those in the traditional semiconductor counterparts.

The proof-of-concept design, wherein a single nanotube is placed on the substrate between the contacts, is utilized in essentially all publication on this topic, for both CMOS circuit (see e.g. V. Derycke et al. Nano Letters 1, p. 453, 2001) and individual transistors (see also E. Ungersboeck, et al, IEEE Transactions on nanotechnology, V4, p. 533, 2005). The drawback of this method is its impracticality for any scale of circuit integration: placement of multiple identical nanotubes to enhance the output current or to form new circuit elements requires a special micro-manipulator and thus precludes any possibility of IC mass manufacturing. The future success of CNT devices will rely on emergence of a cost efficient manufacturing process that will ensure a high-yield and cost efficiency above the modern FET and CMOS technologies.

The present invention is related to this technology. It is based on the growth of a lithographically controlled nanotube array on a metal electrode normally to the electrode plane, followed by sequential deposition of dielectric and metal layers to produce a solid platform for attachment of a second contact to the nanotube tips, thereby forming source and drain electrodes. The transistor gate electrode is made as a third conductive layer sandwiched between the dielectric layers and placed somewhere in the middle of the nanotube length.

Such a technology was described in the U.S. Pat. No. 7,851,784 filed by A. Kastalsky, where several nanotube array devices and methods for their fabrication have been disclosed. Shown in FIG. 1 as a Prior Art, is the drawing from this patent wherein the CNT FET consists of the nanotube 57 grown normally to the substrate, and the gate electrode 51 is attached to the sidewall of every nanotube 57 in the array through a layer of insulator 54. The key element is the metal layer 51 in the middle of the nanotube length, sandwiched between two insulator layers 52 and 53. During deposition of the first insulator layer 52, a thin layer of insulation material will also be deposited on the nanotube walls, thereby forming a gate insulator layer 54 around each nanotube. It is then followed by deposition of the gate metal layer 51 and the insulator layer 53. After polishing of the insulator layer 53 and exposure of the nanotube tips, the top metal layer 55 (the drain electrode) is deposited to complete the structure. Such a design of the CNT transistor, with the nanotube buried within sequentially deposited insulating and metal layers, allows realization of the planar technology for commercial manufacturing of the CNT-based devices and integration circuits.

The above described device technology requires vertical growth of the semiconductor type SWCNT. Typically, they are 1-3 nm in diameter, and are CVD grown from tiny spheres of the catalytic metals, such as Ni, Fe, Cd, formed after melting the nano-pads deposited on the original contact electrode. The nano-pads are designed to be a few nm in diameter to produce a SWCNT. This is a rather challenging job since the current best resolution e-beam lithography can produce pads of only ~20 nm in diameter. For the smallest reliable thickness of the catalytic layer of 0.5 nm, this results in a sphere diameter of ~6-7 nm, which is too large for making SWCNT. There is therefore a necessity to reduce the metal pad diameter below the modern e-beam capabilities. One of such possibilities was disclosed in the US Patent Application #2011/0186808 where a 20 nm opening made by e-beam lithography was designed to be further reduced down to a few nm in diameter using the photo-resist melting procedure. At temperatures elevated above 90 C, the photo-resist is known to soften and behave like a viscous fluid moving toward the opening center thereby shrinking the aperture. After deposition of a ~0.5 nm-thick catalytic metal layer and then metal lift-off, the metal pads with the diameter defined by the reduced aperture will be formed. The resultant effect of shrinking the opening depends on several factors, such as temperature, photoresist thickness and its properties, and duration of the procedure. All these factors must be kept under strict control to obtain the desirable type of the nanotubes with uniform properties over the nanotube array.

The disclosed according to the present invention technique also relates to forming nano-pads of the catalytic metal. Unlike the above discussed method, relying on the photo-resist softening, the present invention is based on a "shadow mask" for the catalytic metal deposition, when the metal evaporation source is positioned under the angle relative to the plane of the openings, while the photo-resist height around the aperture serves as a shadow mask.

Two different shadow mask processes are disclosed, according to the present invention. In one case, the photo-resist itself, having the thickness close to the opening diameter, is utilized as the shadow mask. In the second case, prior to forming the opening, a 20-30 nm—thin layer of insulator is deposited on the original metal contact. The 20 nm opening in the photo-resist is then made using the e-beam lithography, and the insulator is etched within the aperture to expose the bottom contact metal layer. Then photo-resist is removed and the remaining insulator layer around the hole serves as the shadow mask. In both cases, the original opening is made on the metal contact in the shape of a 20×20 nm$^2$ square, and the resultant shadow mask deposition process creates a small metal square pad in one of the corners of the original opening.

The disclosure and analysis of these two shadow mask techniques for obtaining nano-pads of catalytic material are the main objects of the present invention.

DETAILED DESCRIPTION OF THE INVENTION

Both invented methods rely on formation of a barrier serving as a shadow mask for the angled metal deposition, thereby limiting the area of the metal pad within the e-beam produced original opening. The resultant metal pad area depends on the barrier height and angle of the shadow mask, i.e. the angle between the direction from the opening to the metal source and the substrate plane. The most desirable situation arises when the barrier height is close to the opening side, and the angle of metal evaporation is ~45°. In both cases discussed, the original opening represents a square with the minimal for e-beam lithography side of ~20 nm, while the beam of the metal evaporation is directed along one of the diagonals of the square. The above mentioned opening in the photo-resist is formed on the contact layer preliminary deposited on the substrate.

Figure 1:
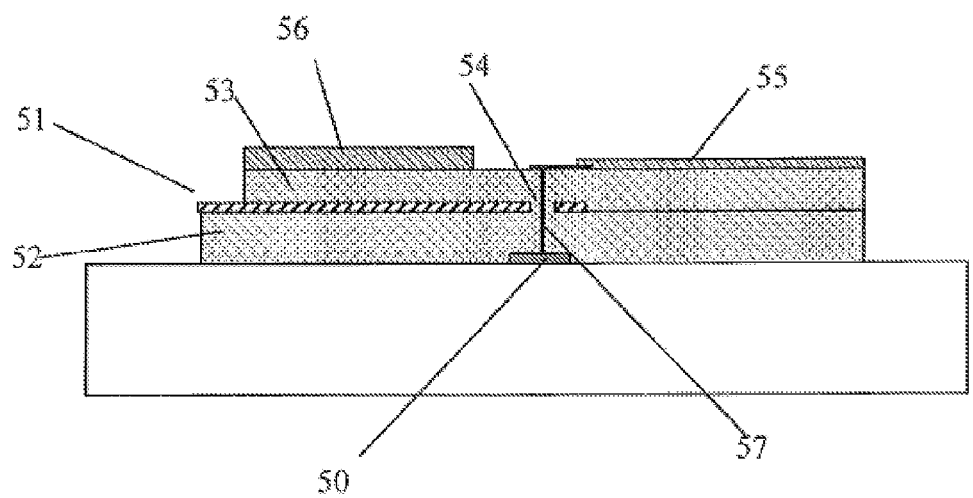
FIG. 1. The cross-sectional view of the CNT transistor with vertically grown nanotubes (Prior Art).
Figure 2:
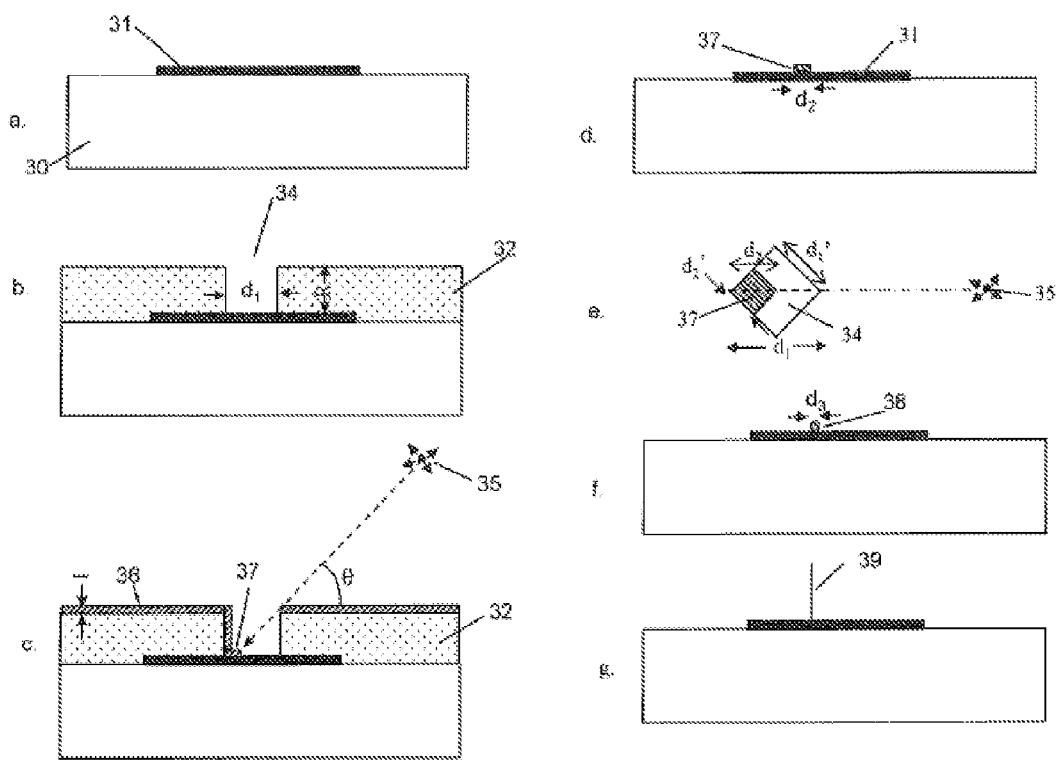
FIG. 2. The processing steps for forming nano-pads with photo-resist as a shadow mask.

FIG. 2 shows the processing steps when a thin layer of the photo-resist serves as a shadow mask. The processing begins from deposition of the contact layer 31 on the substrate 30, FIG. 2a. Then a small opening 34 in the shape of a square is made within the photo-resist 32, FIG. 2b, wherein the distance $d_1$ defines the diagonal of the square, while the barrier height is determined by the photo-resist thickness R. It is followed by the angled catalytic metal deposition of the layer 36 from the source 35, see FIG. 2c, shifted to the right from the opening 34 and directed along the diagonal of the square thereby forming the deposition angle θ. After photo-resist removal, FIG. 2d, a small nano-pad of the catalytic layer 37 remains on the original contact layer 31, the length of the diagonal $d_2$ being controlled by both the barrier height R and the angle of evaporation θ.

FIG. 2e shows an enlarged top view of the nano-pad 37 inside the e-beam produced opening 34. The dashed line of the length $d_1$ is the diagonal of the square. It lies in the plane which is normal to the drawing plane and intersects the center of the metal source 35. The final metal nano-pad 37 has a diagonal of the length $d_2$ and the area $(d_2')^2$, while the original opening area 34 is $(d_1')^2$. This implies that the effect of catalytic metal shrinking produced by shadow mask processing is determined by the ratio $(d_2)^2/(d_1)^2$. After the heat treatment and melting the catalytic metal pad 37 of thickness 1, FIG. 2c, the metal layer coalesces into a ball 38 of the diameter $d_3$, see FIG. 2f. The diameter $d_3$ should be less than 5 nm to grow the SWCNT, see e.g. A.-C. Dupuis, Progress in Material Science, 50 (2005), 929-961. Simple estimates shows that for a realistic thickness of 1=0.5 nm, the length $d_2'$ of the side of the square 37 should be in this case close to or smaller than 3 nm. Shown in FIG. 2g, is the nanotube 39 vertically grown with the assistance of the catalytic ball 38.

The above discussed shadow mask method relies on the barrier for catalytic method deposition created by the wall of the photo-resist 32 after forming the opening 34. The accuracy of this method, i.e. uniformity of the final metal nano-pad areas over the substrate depends on the uniformity of the thickness R of the photo-resist layer 32, see FIG. 2b. For the photo-resist thickness R~20 nm the issue of uniformity may become critical. It is therefore preferable to replace the photo-resist as the shadow mask layer with the dielectric layer whose thickness can be made more controllable and uniform.

Figure 3:
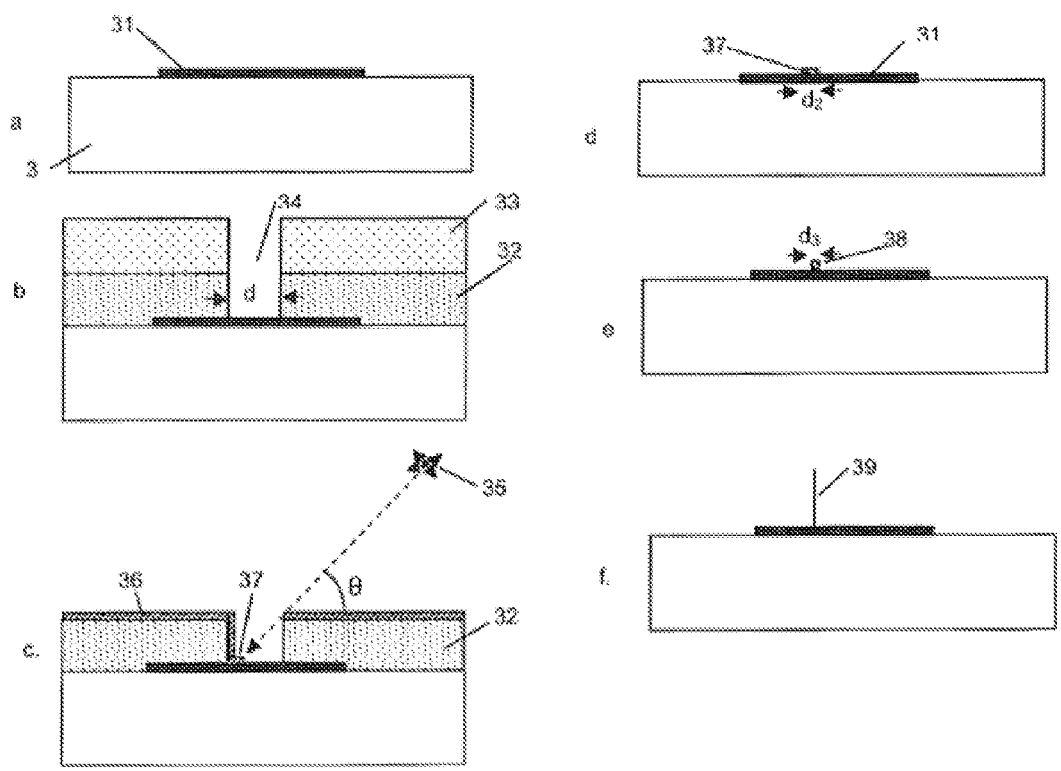
FIG. 3. The processing steps for forming nano-pads with dielectric layer as a shadow mask.

FIG. 3 shows the processing steps for this case. The processing is almost identical to that of the photo-resist-based shadow mask. The only difference is deposition of a thin dielectric layer 33 prior to the photo-resist coating 32, see FIG. 3b. After forming an opening 34 in both photo-resist and dielectric layers the photo-resist layer is removed, FIG. 3c, so that the dielectric layer 33 provides the shadow mask barrier. After angled deposition of the catalytic metal layer 36, the shadow mask dielectric layer 33 is selectively etched, together with the lift-off of the metal layer 36, and remaining nano-pad 37, see FIG. 3d, is then used for further processing, FIGS. 3e and 3f.

The parameters affecting resolution of the invented methods are the diameter of the metal source and its proximity to the opening: if the metal source is too large and/or is located too close to the opening, the metal beam passing the shadow mask barrier will be broadened, thereby reducing the deposition accuracy and limiting the capability of the discussed methods. It is therefore desirable to make the beam cross-section at the deposition plane much smaller than the length of diagonal $d_2$ of the nano-pad square 37, see FIG. 2e.

Figure 4:
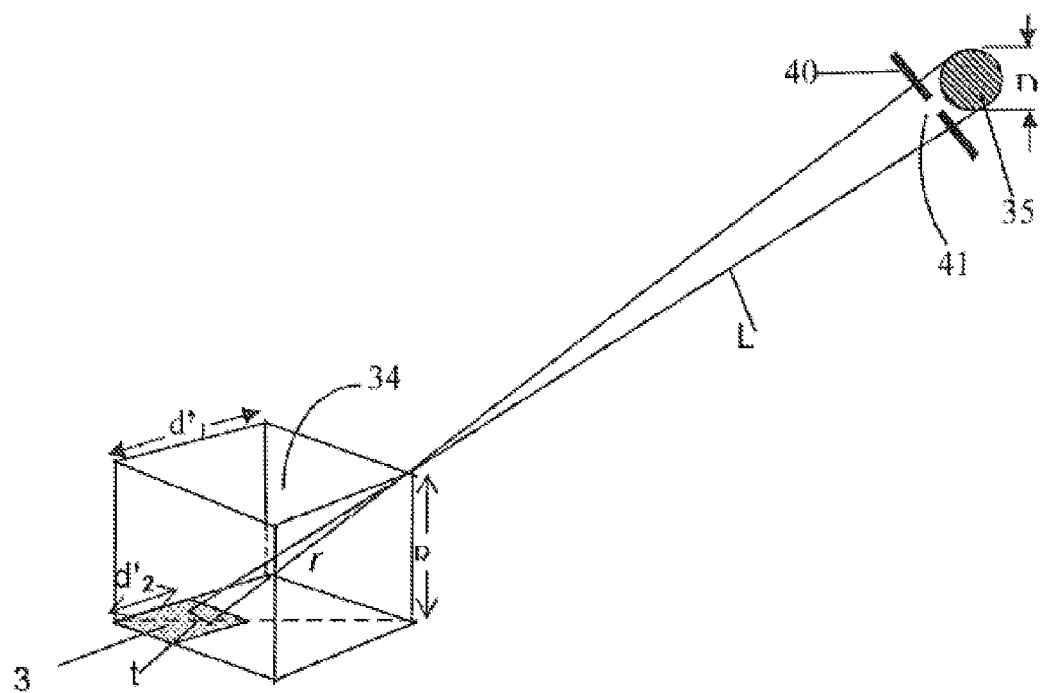
FIG. 4 Illustration of the beam broadening at the metal deposition plane for shadow mask process.

FIG. 4 shows a 3-dimensional box of the shadow mask and the metal source. The cube 42 with the side length $d_1'$ illustrates the opening 34 surrounded by four vertical walls of height R and the nano-pad 37 with the square side $d_2'$. The metal source of diameter D is positioned at the distance L from the right top apex of the cube where the beam enters the cube. The length t along the intersection of the beam with the plane 37 defines the beam broadening, while the length r is the distance which the beam passes inside the cube. Simple estimates show that the length t can be expressed as t~r·D/L. For the distance L=60 cm, the beam diameter D=1 cm and the distance inside the cube r=30 nm, one obtains t—0.5 nm. To further reduce the distance t, one can narrow the beam width using the slit 40 with the slit opening 41. For instance, the reduction of the beam width to 1 mm yields the distance t~0.05 nm, which is sufficiently small to be neglected.

What is claimed is:

1. A method of producing nano-pads of catalytic metal for growing Single Walled Carbon Nanotubes (SWCNT), said method comprising depositing, within an original opening in a photo-resist deposited on a substrate, said original opening defining a two-dimensional surface area on the substrate where the photoresist is absent, a catalytic metal from a catalytic metal source positioned at an angle relative to a direction normal to the two dimensional surface area of the opening in the photo-resist, so as to create a nano-pad of catalytic metal within the opening and on the substrate, said nanopad having a two-dimensional area smaller than the two-dimensional surface area of said original opening, wherein the walls of said original opening in the photo-resist serve as a shadow mask for the angled deposition of said nano-pads of the catalytic metal, said angle and the said walls of said original opening controlling the two-dimensional area of the nano-pads within one corner of the original opening.

2. The method of claim 1, wherein the two-dimensional surface area on the substrate within said original opening in the photo-resist has a square shape, which is oriented toward said catalytic metal source in such a manner that the plane normal to the substrate plane goes through said catalytic metal source and intersects the substrate plane along one of the diagonals of the square shape of the two-dimensional surface area on the substrate within the original opening, so that the resultant nano-pad also has a square shape located on the substrate in one of the corners of said original opening, farthest to said catalytic metal source.

3. The method of claim 1, which includes the following processing steps:
   depositing a contact pad on the substrate;
   depositing a thin layer of the photo-resist and patterning;
   making the original opening in the photo-resist so as to expose at least a portion of the contact pad;
   angled depositing said catalytic metal layer to form the nano-pad;
   removing the photo-resist, so that only said nano-pad of catalytic metal remains on said contact pad;
   treating the nano-pad layer at high temperature to selectively melt the nano-pad metal and form a spherical ball.

4. The method of claim 2, wherein the two-dimensional surface area of said square of the original opening in the photo-resist is ~20×20 $nm^2$, while the walls of said original opening in the photo-resist are ~20 nm high.

5. A method of producing the nano-pads of catalytic metal for growth of Single Walled Carbon Nanotubes (SWCNT), said method comprising
   depositing, within an original opening in a thin dielectric layer deposited on a contact layer, said original opening defining a two-dimensional surface area on the contact layer where the photoresist is absent, a catalytic metal from a catalytic metal source positioned at an angle relative to a direction normal to the two dimensional surface area of the opening in the dielectric layer, so as to create a nano-pad of catalytic metal within the opening and on the contact layer, said nano-pad having a two-dimensional area smaller than the two-dimensional area of said original opening, wherein the walls of said original opening in the said dielectric layer serve as a shadow mask for the angled deposition of said nano-pads of catalytic metal, said angle and the height of the walls of said original opening determining the two-dimensional size of the nano-pads within one corner of the original opening.

6. The method of claim 5, wherein the two dimensional area on the contact layer within said original opening in the dielectric layer has a shape of the square, said square being oriented toward said catalytic metal source in such a manner that the plane normal to the substrate plane goes through said catalytic metal source and intersects the substrate plane along one of the diagonals of said original two-dimensional square, so that resultant said nano-pad also has the shape of the square.

7. The method of claim 5, which includes the following processing steps:
   depositing a contact pad on a substrate;
   depositing a thin layer of the dielectric;
   depositing a photo-resist and patterning;
   making an original opening in the photo-resist;
   making an original opening in the dielectric;
   removing the photo-resist;
   angled depositing said catalytic metal layer to form the nano-pad, removing the dielectric layer and metal lift-off, so that only said nano-pad of catalytic metal remains on said contact pad;
   treating the nano-pad layer at high temperature to melt the nano-pad metal and form a spherical ball.

8. The method of claim 5, wherein the two-dimensional surface area of said original opening in the dielectric is ~20×20 $nm^2$, while the walls of said original opening in the dielectric are ~20 nm high.

* * * * *